March 19, 1946. F. M. MEREDITH 2,396,961
SAW TABLE
Filed Dec. 20, 1944 2 Sheets-Sheet 1

Inventor
F. M. Meredith
by Frederick C. Bromley
ATTY.

March 19, 1946.  F. M. MEREDITH  2,396,961
SAW TABLE
Filed Dec. 20, 1944  2 Sheets-Sheet 2

Inventor
F. M. Meredith
By Frederick C. Bromley
ATTY

Patented Mar. 19, 1946

2,396,961

UNITED STATES PATENT OFFICE 2,396,961

SAW TABLE

Frederick M. Meredith, Toronto, Ontario, Canada

Application December 20, 1944, Serial No. 568,987

1 Claim. (Cl. 143—47)

The invention relates to a power saw table adapted for performing a multiplicity of cutting operations, such as trimming or cutting a standard sheet or panel to a particular size, rip sawing a board, and cutting dadoes, ploughs, grooves, tenons, etcetera.

The primary object of the invention is to provide an apparatus in which a work table is furnished with a floating foot having means for guiding a portable rotary saw by which the saw can be slid across the table to operate upon the work. An important feature of construction is that the guide means are adapted to entirely take the weight of the saw so that the workman only needs to push it along in order to make a cut.

A further object of the invention is to provide an apparatus in which the floating foot is devised to be raised and lowered by a parallel movement so that the work can be placed on the table and held by lowering the said foot into clamping engagement therewith to retain it against shifting while the saw is traversed. The blade of the saw travels in a slot in the table.

A still further object is to supply a floating foot suspended by links connected by a rod for parallel elevational movement of the foot and adapted to be actuated by a lever having a locking device for maintaining the foot in different positions of adjustment.

A still further object is to produce a saw table by which sheet stock may be accurately cut to size, for which purpose there is provided a measuring device that obviates the necessity of marking off an intended cut with a pencil and rule.

A corollary feature of the apparatus is that the power saw is capable of being secured on the floating table for rip cutting, for which purpose a special gauge is furnished and devised to be removed when not required.

The advantages and utility of the apparatus will be more clearly understood from the ensuing specification considered along with the accompanying drawings in which a selected embodiment of the invention is illustrated.

In the drawings.

Like numerals of reference indicate corresponding parts in each of the figures throughout the drawings of the invention.

Figure 1:
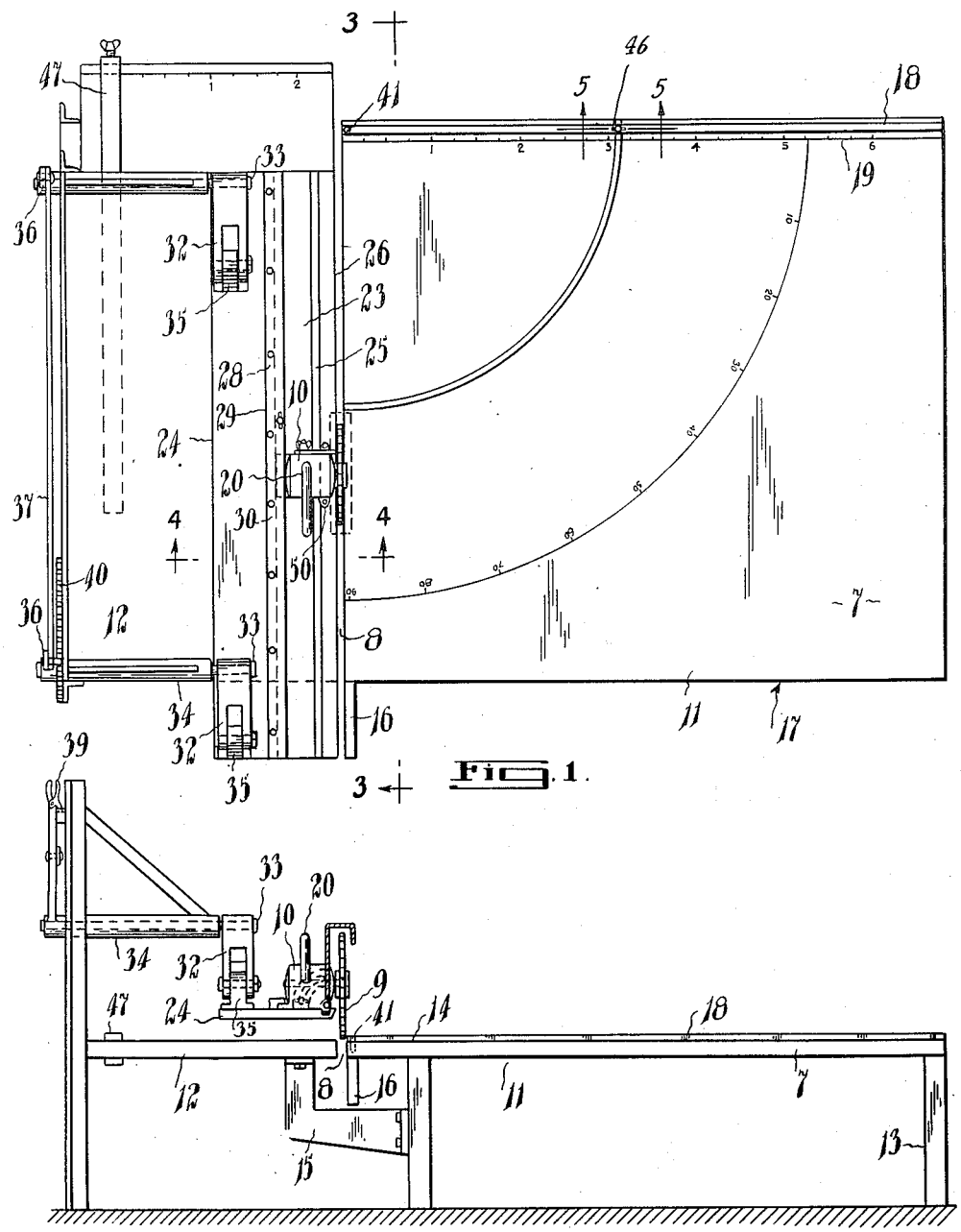
Fig. 1 is a plan view of the invention.
Figure 2:
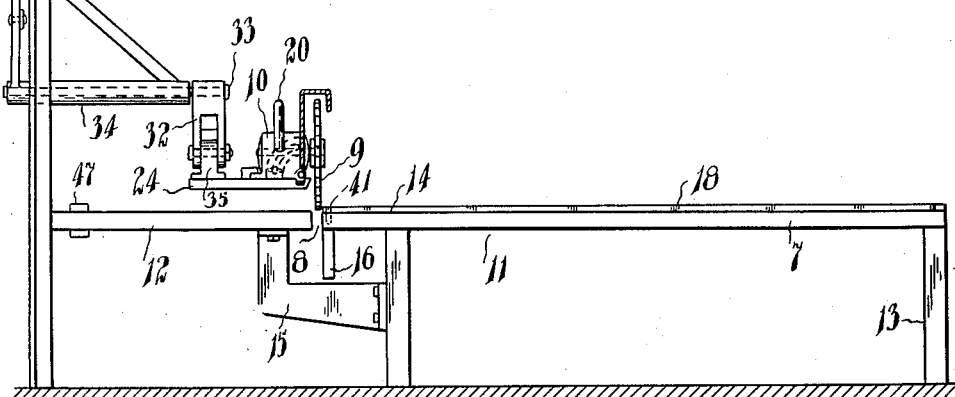
Fig. 2 is a front elevational view thereof.
Figure 3:
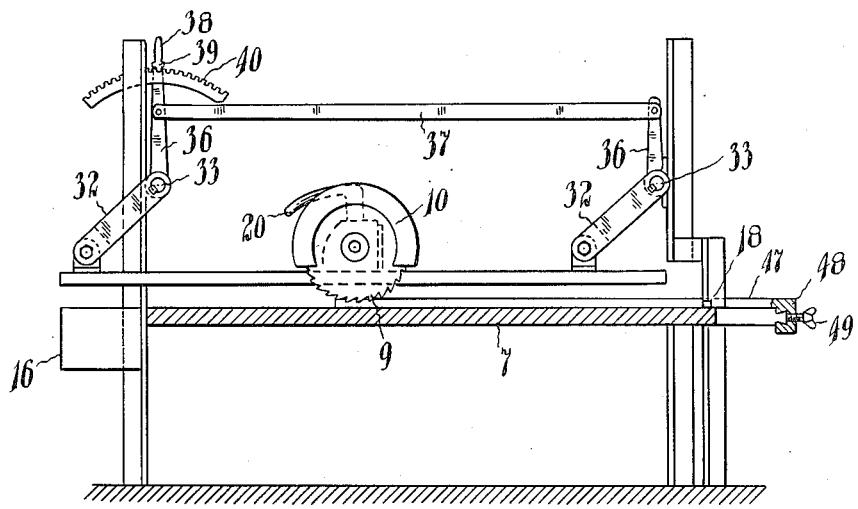
Fig. 3 is a cross section on line 3—3 of Fig. 1.
Figure 4:
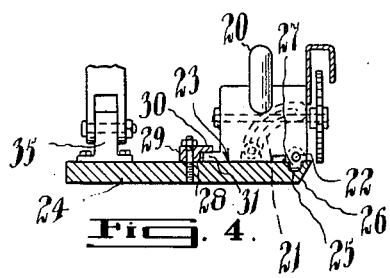
Fig. 4 is a cross section on line 4—4 of Fig. 1.

In carrying out the invention there is provided a work table generally denoted by the numeral 7, transversely divided by a slot 8 receptive to the blade 9 of a saw 10. The slot runs the full width of the table and divides the top into two sections 11 and 12 which are of a sufficient width to receive standard four-foot sheet stock of wood, wall-board, "Gyprock," "Masonite," etcetera of any length. The table has a suitable arrangement of legs 13 which are comparatively short so that the workman may more easily reach across the supporting surfaces 14 which are co-planar.

The sections of the table are suitably connected below the slot 8 as by brackets 15 which permit the saw-blade to project freely in the slot and to traverse the full width of the table while engaged therein.

The main section 11 may have a safety guard plate 16 protruding outwardly from its front edge 17 immediately adjacent to the slot so that as the saw is fully withdrawn from the workpiece the blade will be shielded from coming into contact with the person of the operator and injuring him.

The remote side of the main section 11 is supplied with a gauge 18 in the nature of a straight edge at right angles to the slot 8. A longitudinal edge of a panel or other sheet stock is placed against the gauge for accurately making a cut normal to the length thereof. Alongside of the gauge there is provided a measuring device 19 which may be in the form of a regular scale sunk in the table top to lie flush with its surface. Accordingly, should it be required to cut down a standard panel of a size, say four feet by six feet to four feet by five feet, it is only necessary to place the panel on the table and align its remote end with the five-foot graduation mark to sever the stock at the proper place in using the saw.

A conventional type of power saw is used having a circular blade driven by an electric motor mounted in a housing having a handle 20. This portable saw unit is well known and has a depth regulator and a device 21 by which the blade may be adjusted about an axis 22 for setting it at an acute angle. The housing ordinarily has a smooth bottom surface for resting and sliding on the work, but in performing the present invention the housing is supported on the surface 23 of the floating foot 24 and means are supplied to guide the housing along the surface. The floating foot extends completely across the table above the section 12 thereof.

The guide means comprise a longitudinal groove 25 in the slide surface 23 of the foot adjacent to the inner edge 26, in which is disposed a tongue 27 that projects from the housing of the saw. Additionally there is a groove 28 rearwardly of the groove 25 and parallel thereto. Groove 28 is formed by a strip 29 attached to the foot and provides a lip 30 which fits over a lug 31 on the saw housing so as to prevent the saw unit from tilting under stress of the cutting blade.

The floating table is carried by a pair of links 32 each rigidly connected to a shaft 33 journalled in a bracket 34. One link is disposed at each end of the floating foot and pivoted thereto as by an ear 35. The links are arranged parallelly and the shafts 33 are supplied with means for their joint movement. The means preferably comprise a pair of arms 36, one of which is keyed or otherwise secured to each shaft, and a rod 37 pivoted to the arms. One of the arms is devised as a lever by virtue of the handle part 38 which has a locking device 39 for engaging a quadrant 40.

It will be evident that by this construction the handle functions to lower and raise the floating platform which can be secured by the locking device in any position of elevation. To trim or cut a sheet the floating platform is lowered to rest upon the same so as to clamp it while the saw is manually traversed by its handle.

Figure 5:
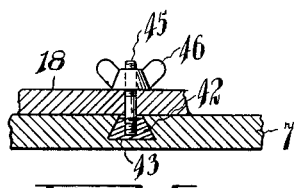
Fig. 5 is a fractional section on line 5—5 of Fig. 1.
Figure 6:
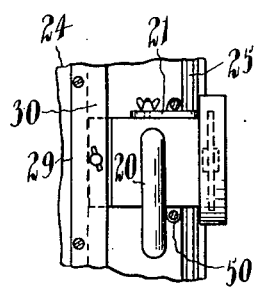
Fig. 6 is a detail showing the means for locking the power saw on the floating foot.

The gauge 18 may be used as a swingable member of a protractor for cutting sheet stock at an acute angle, for which it is pivoted at 41 to swing over the section 11 of the table and means are supplied to lock it in any angular position. The locking means may consist of a slide member 42 loosely engaged in a dovetail slot 43 curved in an arc concentric with pivot 41 and formed in the surface of the section 11, which surface is graduated in degrees as at 44. The slide member has a screw-threaded shank 45 extending through a hole in the gauge and engaged with a wing nut 46 by which it may be locked in a set position—best seen in Fig. 5.

For the purpose of rip sawing, the gauge can be removed so that the stock can be fed from the remote side of the table. A gauge 47 is substituted and fitted on the rear edge of the section 12 by means of a slide connection 48 having a locking device 49. This gauge extends parallel to the slot 8 for guiding a board against the saw which is fixed on the floating foot for the ripping operation. Any approved means may be resorted to for securing the saw. For instance, the housing may be equipped with lugs 50 bolted or otherwise fastened to the floating foot which is set at an elevation to permit the board to pass freely thereunder as it is cut by the blade. The edge 26 of the floating foot recedes angularly to enable the saw blade to be set at an acute angle as may be required in performing certain operations that may be advantageously carried out by the apparatus.

It will be manifest that the invention provides a highly useful and serviceable apparatus, and one that is inexpensive to manufacture.

What I claim is:

A saw table comprising a top having a broad flat surface for supporting a panel or other stock, a floating foot disposed transversely over the top, links pivoted thereto, shafts rigidly carrying the links, brackets supporting the shafts, a rod connecting the links for parallel movement, a handle connected to one of the shafts and having a locking device, a quadrant adapted to be engaged by the locking device, and a power saw unit slidably mounted on the floating foot for guided movement.

FREDERICK M. MEREDITH.